Oct. 23, 1962   J. F. SPIELMAN   3,059,966
ENERGY-ABSORBING MEANS
Filed Nov. 4, 1959   3 Sheets-Sheet 1
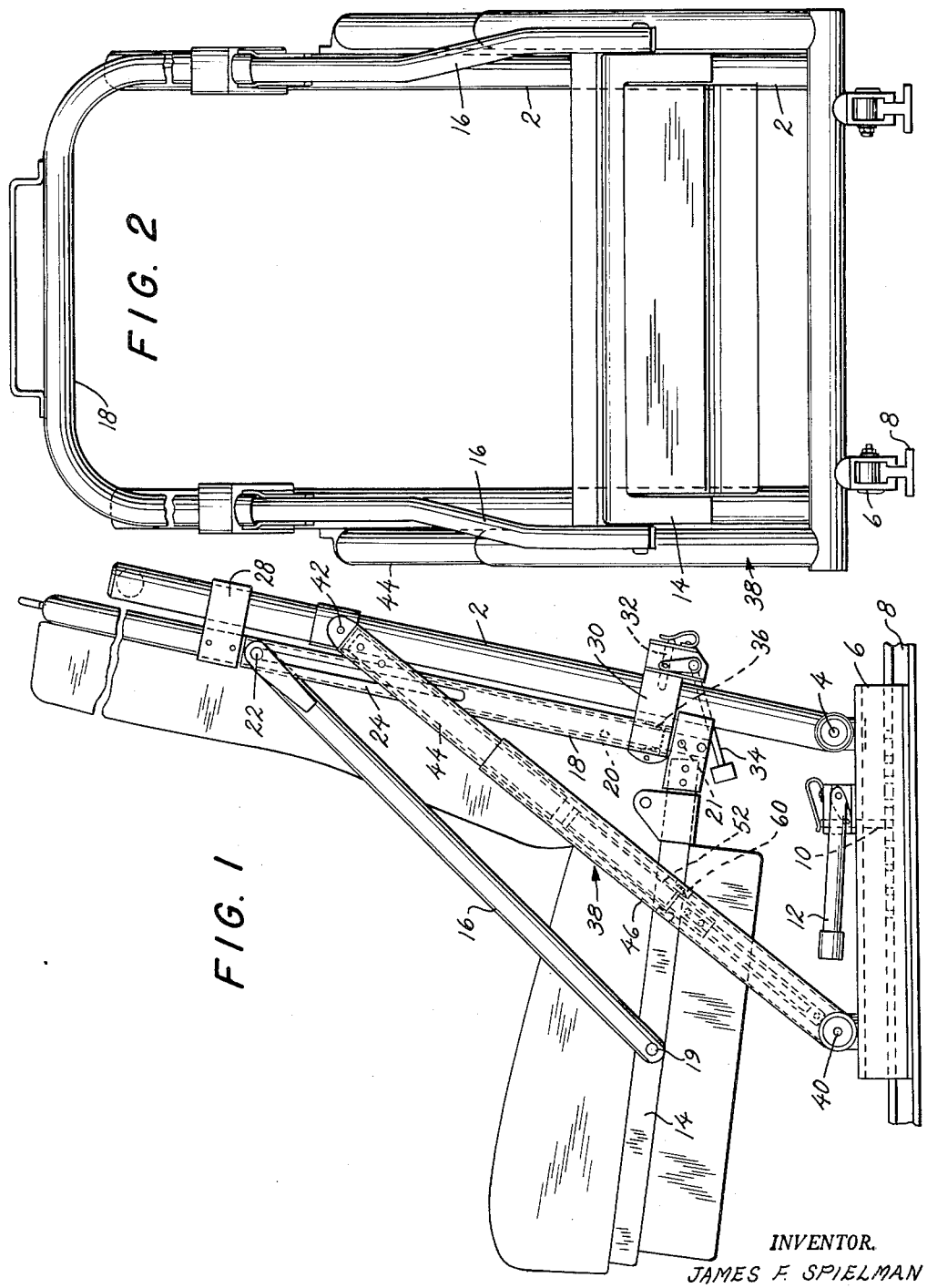
INVENTOR.
JAMES F. SPIELMAN
BY
James G. Bethell
ATTORNEY

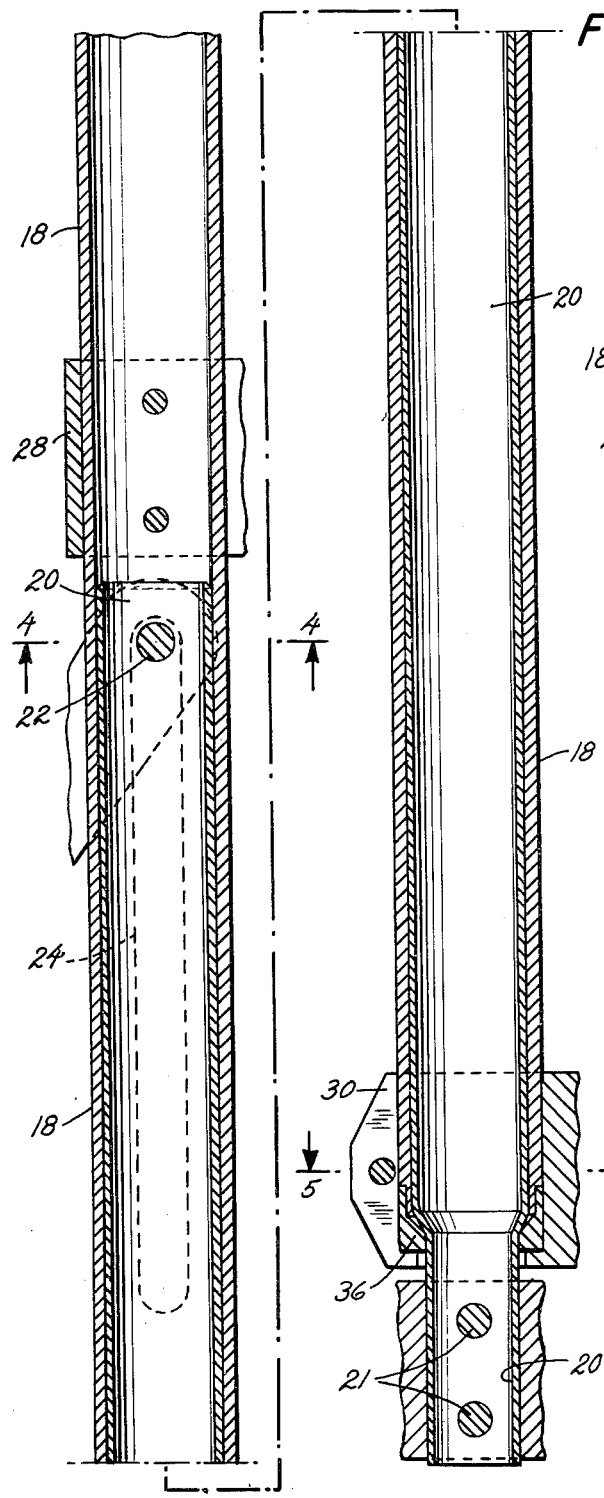
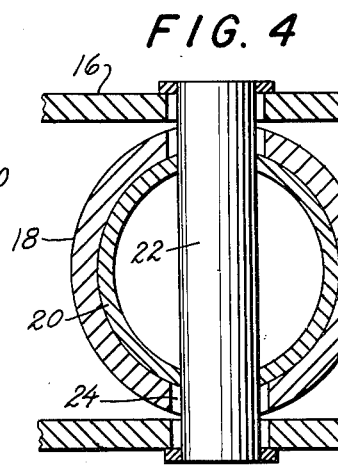
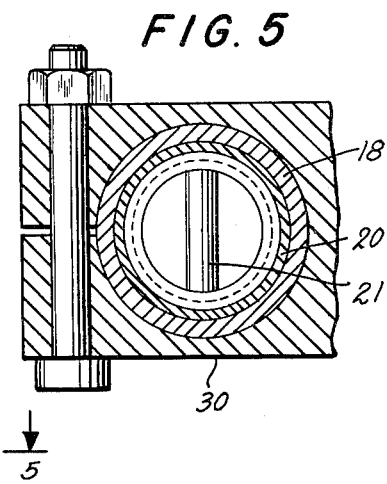

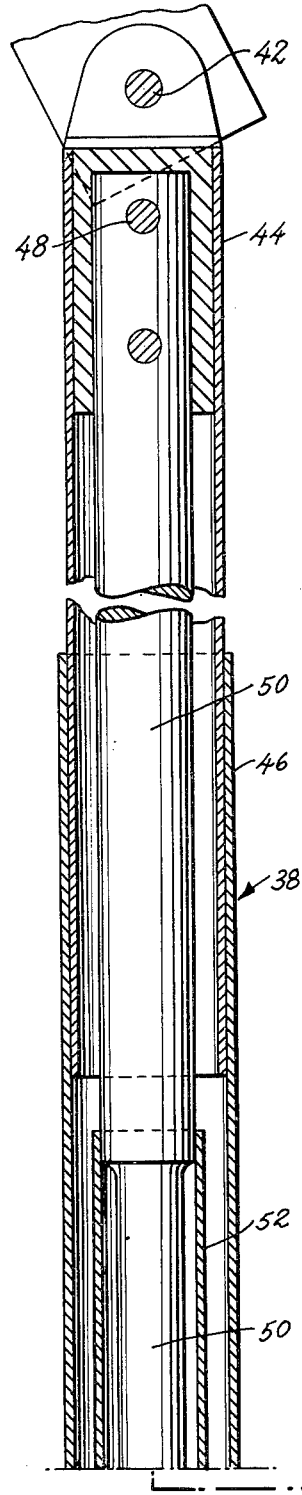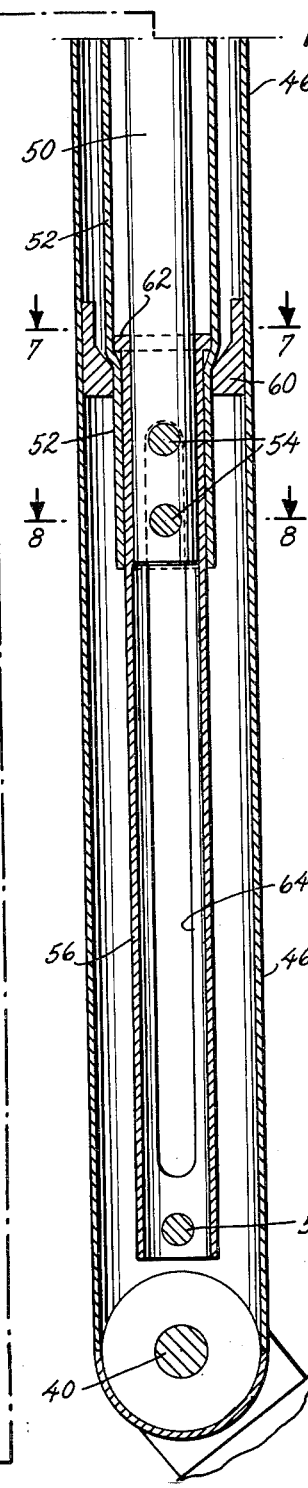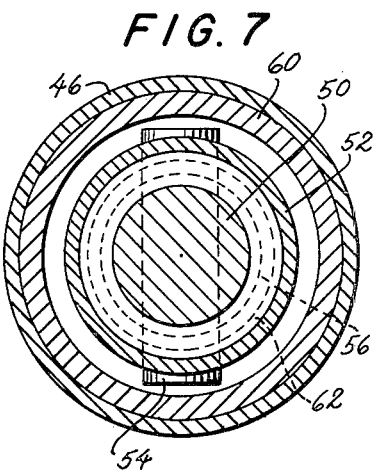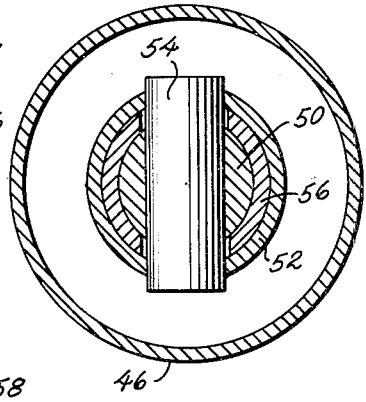
INVENTOR.
JAMES F. SPIELMAN
ATTORNEY

United States Patent Office 3,059,966
Patented Oct. 23, 1962

3,059,966
ENERGY-ABSORBING MEANS
James F. Spielman, Bantam, Conn., assignor to Aerotec Industries, Inc., Greenwich, Conn., a corporation of Connecticut
Filed Nov. 4, 1959, Ser. No. 850,954
8 Claims. (Cl. 297—216)

This invention relates broadly to energy-absorbing means and has for one of its objectives to provide means for diminishing the shock to an object incident to sudden deceleration of a moving second object carrying the first object.

This invention has for another objective to provide energy-absorbing means of this general character in which means are present for preventing recoil or reversal of the energy-absorbing means subsequent to its operation.

More specifically, the present invention provides energy-absorbing means involving a die and draw-tube arrangement which is new and novel in construction and operation. As above noted, my improved device includes a non-reversing feature which is so constructed and arranged that, after the draw tube has been forced through the die to reduce the diameter of the tube, thereby to absorb energy, reversal of the draw tube in the die is opposed, my invention providing that, in order that the draw tube may be reversed, it must be expanded to substantially its original diameter.

It will be appreciated that the energy-absorbing means of the present invention is usable in a great many fields. I shall describe and illustrate it in connection with crew seats for aircraft. It is to be understood that this is purely for clarity of description and illustration and is not to be taken as limiting my invention to this field.

As applied to aircraft seats, the present invention provides a construction for absorbing the energy of downward loading of the seat, as when the aircraft is landing upon a carrier, for example, and for absorbing the energy of horizontal loading of the seat when the forward movement of the aircraft is abruptly decelerated as, for example, upon collision of the aircraft with another object, or upon engagement of the undercarriage of the aircraft with the gear with which carriers are equipped and by which the aircraft is brought to rest.

Still more specifically, as applied to seats, the present invention provides a seat structure embodying a seat frame carried by a stanchion which is fixed in position so far as vertical movement relative to the aircraft is concerned. The attachment of the frame to this stanchion is such that part of the frame can move downwardly relative thereto upon predetermined deceleration of the aircraft in a downward direction, as in making a landing, for example, and can move forwardly relative to the aircraft as the forward movement of the aircraft is decelerated. These two movements of the seat frame are controlled by energy-absorping means provided by this invention, which, while permitting the seat frame to move as indicated, opposes these movements uniformly, as distinguished from spring-loading, either tension or compression, where opposition to movement, instead of being uniform, increases with extent of movement of the seat frame.

It will be appreciated that the construction above briefly referred to will relieve a seat occupant harnessed to the seat of a great deal of the shock inherent in making a landing, for example, where vertical and horizontal decelerations are high.

Before describing the improved construction of this invention in detail, it may be noted that the seat frame, at each side, is provided with a draw-die energy-absorbing arrangement, whereby, as the aircraft contacts the ground or the carrier deck—in other words, is abruptly decelerated so far as descent is concerned—one part of the seat frame will be caused to move through a die carried by a second and fixed part of the frame, so that the moving part of the frame will be decelerated uniformly as distinguished from non-uniformly or abruptly. The seat frame is also provided with another die arrangement whereby, as the aircraft is abruptly decelerated in a forward direction, a movable part of the frame will be moved through a fixed die uniformly to decelerate the seat, means being provided to prevent reversal or recoil of the seat.

FIG. 1 of the accompanying drawings is a side elevation of a seat embodying the invention;

FIG. 2 is a front elevation of the seat of FIG. 1, with the upholstery removed for clarity of illustration;

FIG. 3 is a sectional view of that part of the seat frame embodying the die arrangement which functions upon abrupt deceleration of the descent of the aircraft;

FIG. 4 is a section taken on the line 4—4 of FIG. 3;

FIG. 5 is a section taken on the line 5—5 of FIG. 3;

FIG. 6 is a sectional view of that part of the seat frame which embodies the die arrangement which functions upon abrupt deceleration of the forward movement of the aircraft;

FIG. 7 is a section taken on the line 7—7 of FIG. 6; and

FIG. 8 is a section taken on the line 8—8 of FIG. 6.

Referring to the drawings in detail, 2 designates a stanchion frame for the seat comprising a pair of vertical posts and a lateral tie beam, this stanchion frame being fixed in position so far as any vertical movement relative to the aircraft is concerned. The lower end of the stanchion frame is pivoted at 4 to channels 6, mounted on rails 8, which are fixedly secured to the floor of the aircraft. The stanchion frame and the channels 6 are adjustable along the rails 8 to provide for fore and aft adjustment of the stanchion frame, spring-loaded pins 10 holding the stanchion frame in adjusted position. These pins can be retracted by a handle 12 (FIG. 1) to permit the stanchion frame to be shifted.

14, 16, and 18 designate a rigid, triangular support frame for the seat bottom. There are two frame members 14, one at each side of the seat, these members extending forwardly substantially horizontally. There are two frame members 16, one at each side of the seat, these members extending diagonally. The vertically extending frame member 18, which takes the form of an inverted U, is tubular, and each leg of the U contains a draw tube 20, the lower end of each of which is connected to the inner end of the corresponding forwardly extending frame member 14 by pins 21. The upper end of each of the draw tubes 20 is connected to the upper end of the corresponding diagonal frame member 16 through pin 22. The lower end of each diagonal frame member 16 is connected to the corresponding forwardly extending frame member 14, as shown at 19. Each leg of the tubular frame member 18 is slotted longitudinally, as seen at 24, to permit the pins 22 to move downwardly as the draw tubes 20 are moved in the same direction.

This construction, it will be obvious, makes provision for unitary downward movement of the frame members 14 and 16 and the draw tubes 20 relative to the legs of the tubular frame member 18 upon downward loading of the seat bottom.

The support-frame members 14, 16, and 18 are attached to the seat stanchion frame 2 for unitary adjustment vertically thereof through stanchion blocks 28 and 30 and are held in adjusted position by spring-loaded pins 32 (FIG. 1), the pins being retracted by a handle 34 when vertical adjustment of the seat frame members is being made.

As so far described, it will be seen that the seat frame is adjustable fore and aft as well as vertically and is rigidly held in adjusted position.

It has been pointed out that one of the primary objectives of this invention is to provide energy-absorbing means for reducing the shock to a person harnessed to the seat when the downward movement of the aircraft in which the improved seat is installed is abruptly decelerated; for example, when the descending aircraft makes contact with the ground or with the deck of a carrier.

Referring to FIG. 3, it will be observed that each leg of the vertically extending tubular frame member 18 is provided interiorly at its lower end with a draw die 36, the lower end of each of the draw tubes 20 being reduced in outside diameter so that they may extend a short distance through the dies. This reduced portion of each of the draw tubes is rigidly secured to the corresponding frame member 14 at 21. It will be apparent, therefore, that, as the descending aircraft contacts the ground or the deck of a carrier, causing abrupt deceleration of the aircraft, the resultant downward loading of the seat frame will move the draw tubes 20 through the dies 36 to reduce the diameter of the unreduced portion of the tubes, thereby uniformly decelerating the downward movement of the seat frame, to bring the frame to rest without objectionable shock to the seat occupant. In other words, so far as this feature is concerned, provision is made for uniform energy absorption upon deceleration of the downward movement of the aircraft in which the seat is mounted, thereby reducing the shock to the seat occupant when making a landing.

As above pointed out, the present invention also provides for energy absorption respecting sudden deceleration of the seat when moving in a forward direction, thereby reducing the shock to the seat occupant when the forward movement of the aircraft is suddenly decelerated, as in making a landing upon the deck of a carrier, for example.

Referring to FIGS. 1, 6, 7, and 8, it will be seen that 38 designates a pair of sectional braces, one brace at each side of the seat. The details of these braces are best illustrated in FIGS. 6, 7, and 8. Each brace comprises a tube 44, which is connected pivotally at its upper end to the stanchion frame 2 at 42. Each tube 44 extends slidably into a tube 46, which is pivotally attached at its lower end to the corresponding channel 6, as shown at 40.

Extending along the interior of each of the tubes 44 and 46 is a drive rod 50. Each rod is rigidly secured at its upper end by pins 48 to the corresponding brace tube 44 (see FIG. 6). Each drive rod 50 throughout part of its length, lies within a draw tube 52, to which it is attached at its lower end by pins 54. Lying within the lower portion of each brace tube 46 and extending for a short distance into the lower end of the corresponding draw tube 52 is a non-reversing sleeve 56. At its lower end each sleeve is secured to the corresponding brace tube 46 by a pin 58. 60 designates a draw die fastened on the inner wall of each of the tubular brace members 46 just above the lower end of the drive rod 50 and draw tube 52, the draw tube being reduced in diameter from a point abreast of this die to the lower end of the tube so as to project for a short distance through the die. It is to be noted that the upper end of each of the non-reversing sleeves 56 extends upwardly between the reduced portion of the draw tube 52 and the drive rod 50 to just above the die 60, where each sleeve is enlarged in diameter substantially to the inside diameter of the draw tube at this area. This enlarged portion of the sleeve has been designated 62. Each non-reversing sleeve is slotted longitudinally as seen at 64, to permit the pins 54, by which the drive rods 50 and draw tubes 52 are attached to each other, to move downwardly relatively to the non-reversing sleeves, to permit a like unitary movement of the drive rods and draw tubes.

It will now be apparent that, with an occupant strapped in the seat, deceleration of a forwardly moving aircraft will move the tubes 44 of the braces 38 downwardly within the tubes 46 of the braces, to apply a compression load to the draw tubes 52 to force the same through the dies 60, reducing the diameter of the unreduced portion of the tubes, thereby absorbing energy and uniformly decelerating the seat and its occupant. In this operation, the pins 54, by which the drive rods 50 and draw tubes 52 are attached to each other, are free to move along the slots 64 of the non-reversing sleeves 56, so that the sleeves are not moved. Recoil of the seat frame, that is, reverse movement of the draw tubes through the dies 60 is effectively resisted by the enlarged upper end of each non-reversing sleeve 56 in that the tubes would have to move upwardly relatively to the non-reversing sleeves, which would necessitate expansion of the tubes to their original diameter.

It will be appreciated from all of the foregoing that my invention provides energy-absorbing means adapted for installation between two objects, one of which is capable of bodily displacement relative to the other, for reducing the shock to one object when the other is suddenly decelerated. It will be appreciated also that this energy-absorbing means comprises a die cooperating with a draw tube which, under the deceleration mentioned, will force the draw tube through the die, reducing the tube diameter and, hence, absorbing energy. It will be seen furthermore that my energy-absorbing means comprises means for opposing recoil or reverse movement of the draw tube, it being necessary in my construction to expand the reduced draw tube to its original diameter in order that it may be reversed.

It will be further appreciated from all of the foregoing that, with respect to aircraft seats, the present invention provides means for reducing the shock to a seat occupant when deceleration of the aircraft, both in descending and forward movement, reaches a predetermined rate, the energy-absorbing means of my invention providing uniform deceleration of the seat and its occupant upon abrupt deceleration of the aircraft.

It is to be understood that changes may be made in the details of construction and arrangement of parts hereinabove described and illustrated in the accompanying drawings without departing from the spirit and scope of the invention.

What I claim is:

1. Energy-absorbing means for installation between and attachment to two simultaneously movable objects to reduce the shock imposed upon either one of said objects due to a sudden change in the relative speeds of the two objects, said energy-absorbing means comprising, in combination, a die for attachment to one of said objects and a cooperating draw tube for attachment to the other of said objects whereby, upon sudden deceleration of one of said objects relative to the other, the draw tube will be pushed through said die, progressively reducing the diameter of said draw tube and absorbing energy, uniformly to decelerate the other of said objects; and means within said tube and affixed to one of said objects for opposing reverse movement of the draw tube in the die subsequent to its energy-absorbing movement.

2. Energy-absorbing means for installation between and attachment to two simultaneously movable objects to reduce the shock imposed upon one of said objects due to a sudden change in the relative speeds of the two objects, said energy-absorbing means comprising, in combination, a die adapted to be affixed to one of said objects; cooperating draw tube adapted to be affixed to the other of said objects whereby, upon sudden deceleration of one of said objects relative to the other, the draw tube will be forced through said die, progressively to compress the tube to a reduced diameter, thereby absorbing energy, uniformly to decelerate the other of said objects; a non-reversing member lying within said draw tube; and means for fixing the non-reversing member relative to said die so that, as the draw tube moves through the die, it will move along said non-reversing member, a portion of the non-reversing member, substantially at the area where the said compression of the draw tube to reduced diameter is initiated, tightly fitting the interior of the uncompressed portion of the draw tube, thereby to oppose reversal of the draw tube relative to the non-reversing member.

3. Energy-absorbing means for installation between and attachment to a movable first object and a movable second object carried thereby to reduce the shock imposed upon the second object due to sudden deceleration of the first object, said energy-absorbing means comprising a die affixed to the first object and a draw tube affixed to the second object whereby, upon sudden deceleration of the first object, the draw tube will be forced longitudinally through said die, progressively to compress the tube to reduced diameter, thereby absorbing energy, uniformly to decelerate the second object; and a non-reversing member lying within said draw tube and affixed to the said first object and, hence, fixed in relation to said die whereby, as the draw tube is forced through the die, it will move along said non-reversing member, a portion of said non-reversing member fitting the interior of the uncompressed portion of the draw tube at the area where reduction in the draw tube diameter is initiated, thereby presenting a barrier to withdrawal of the reduced portion of the draw tube through the die.

4. An aircraft seat comprising, in combination, a triangular seat frame; a supporting stanchion frame for said seat frame, said seat frame comprising a horizontally extending frame member, a vertically extending frame member, and a diagonally extending frame member; means for adjustably securing said vertically extending frame member to said stanchion frame; a die affixed to the inner wall of said vertically extending frame member; a draw tube within said vertically extending frame member, the lower end of the draw tube being reduced in outside diameter so as to project through said die; means for attaching this projecting end of the draw tube to the said horizontally extending seat frame member; and means for attaching the upper and lower ends of said diagonal seat frame member, respectively, to the upper end of the draw tube and to the horizontally extending seat frame member, whereby, when deceleration of the aircraft in a descending direction exceeds a predetermined rate, said draw tube will be pushed through said die, thereby uniformly to decelerate descent of the seat frame.

5. An aircraft seat comprising, in combination, a triangular seat frame; a supporting stanchion frame for said seat frame, said seat frame comprising a horizontally extending frame member, a vertically extending frame member, and a diagonally extending frame member; means for adjustably securing said vertically extending frame member to said stanchion frame; a die affixed to the inner wall of said vertically extending frame member; a draw tube within said vertically extending frame member, the lower end of the draw tube being reduced in outside diameter so as to project through said die; means for attaching this projecting end of the draw tube to the said horizontally extending seat frame member; means for attaching the lower end of the diagonal seat frame member to the horizontally extending seat frame member; and a pin extending through a longitudinal slot in the vertically extending seat frame member for attaching the upper end of said diagonal frame member to the upper end of said draw tube, whereby said draw tube will be pushed through said die when descent of the aircraft is decelerated above a predetermined rate, thereby uniformly to decelerate descent of the seat frame.

6. A seat for aircraft comprising, in combination, a seat frame; a vertically extending stanchion frame carrying the seat frame; means for pivotally mounting the lower end of the stanchion frame on the aircraft floor; a diagonal brace comprising a pair of slidably telescoping tubes; means for pivotally attaching the upper end of the upper tube of said pair of tubes to said stanchion frame, the lower end of the lower tube of said pair of tubes being pivotally mounted on the aircraft floor; a die secured to the inner wall of the lower tube of said brace; a draw tube within said brace, the lower end of said draw tube being reduced in outside diameter so as to project for a short distance through said die; a drive rod within said draw tube and secured at its lower end to the lower end of the draw tube; and means for attaching the upper end of said drive rod to the upper tube of the diagonal brace, whereby upon forward pivoting of the stanchion frame as the aircraft is decelerated above a predetermined rate, said drive rod will push the said draw tube through said die, uniformly to decelerate the forward movement of the seat frame.

7. A seat for aircraft comprising, in combination, a seat frame; a vertically extending stanchion frame carrying the seat frame; means for pivotally mounting the lower end of the stanchion frame on the aircraft floor; a diagonal brace comprising a pair of slidably telescoping tubes; means for pivotally attaching the upper end of the upper tube of said pair of tubes to said stanchion frame, the lower end of the lower tube of said pair of tubes being pivotally mounted on the aircraft floor; a die secured to the inner wall of the lower tube of said brace; a draw tube within said brace, the lower end of said draw tube being reduced in outside diameter so as to project for a short distance through said die; a drive rod within said draw tube and secured at its lower end to the lower end of the draw tube; means for attaching the upper end of said drive rod to the upper tube of the diagonal brace, whereby, upon forward pivoting of the stanchion frame as the aircraft is decelerated above a predetermined rate, said drive rod will push the said draw tube through said die, uniformly to decelerate the forward movement of the seat frame; a non-reversing sleeve within the lower tube of said brace; means for securing the lower end of said sleeve to the lower end of the said brace tube, said sleeve extending upwardly between said draw tube and drive rod above said die; and an annular flange on the upper end of said sleeve, larger in diameter than the inside diameter of that portion of the draw tube which has passed through the die, thereby to prevent recoil of the draw tube through the die.

8. A seat structure for aircraft comprising, in combination, a seat frame and a rigid stanchion for supporting said frame, said seat frame comprising a horizontally disposed seat frame member and a tubular, vertically disposed seat frame member vertically adjustable relatively to said stanchion; a die within said tubular, vertically disposed seat frame member and rigidly affixed thereto; a draw tube within said tubular, vertically disposed seat frame member, the lower end of this draw tube being of reduced outside diameter so as to project through said die beyond the lower end of the vertically disposed seat frame member; means for locking the vertically disposed seat frame member to the stanchion in adjusted position; and means for securing the projecting end of said draw tube to the said horizontally disposed seat frame member, whereby, with the vertically disposed seat frame member locked to the said stanchion, when deceleration of the aircraft in a descending direction exceeds a predetermined rate, the said draw tube will be forced through said die, uniformly to decelerate descent of the seat frame.

References Cited in the file of this patent
UNITED STATES PATENTS

| | | |
|---|---|---|
| 2,401,748 | Dillon | June 11, 1946 |
| 2,615,373 | Pegard | Oct. 28, 1952 |
| 2,637,368 | Cotton | May 5, 1953 |
| 2,710,047 | Duppstadt | June 7, 1955 |
| 2,857,056 | Dilworth | Oct. 21, 1958 |
| 2,931,601 | Johnson | Apr. 5, 1960 |
| 2,933,127 | Brewster | Apr. 19, 1960 |
| 2,959,207 | Brewster | Nov. 8, 1960 |